(12) United States Patent
Finley, Jr. et al.

(10) Patent No.: US 7,793,264 B2
(45) Date of Patent: Sep. 7, 2010

(54) COMMAND-LINE WARNINGS

(75) Inventors: Paul B. Finley, Jr., Austin, TX (US); Eduardo L. Reyes, Austin, TX (US); Vi T. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/467,305

(22) Filed: Aug. 25, 2006

(65) Prior Publication Data

US 2008/0127105 A1 May 29, 2008

(51) Int. Cl.
G06F 9/444 (2006.01)
G06F 9/45 (2006.01)

(52) U.S. Cl. .......................... 717/127; 717/124; 717/125

(58) Field of Classification Search .......... 717/124–129
See application file for complete search history.

(56) References Cited

U.S. PATENT DOCUMENTS

| | | | | |
|---|---|---|---|---|
| 5,602,729 | A * | 2/1997 | Krueger et al. | 717/124 |
| 5,669,000 | A * | 9/1997 | Jessen et al. | 717/127 |
| 5,737,609 | A * | 4/1998 | Reed et al. | 717/126 |
| 6,026,235 | A * | 2/2000 | Shaughnessy | 717/127 |
| 6,647,544 | B1 * | 11/2003 | Ryman et al. | 717/124 |
| 6,662,312 | B1 * | 12/2003 | Keller et al. | 714/38 |
| 6,708,324 | B1 * | 3/2004 | Solloway et al. | 717/124 |
| 6,915,509 | B1 * | 7/2005 | Chkodrov et al. | 717/124 |
| 6,934,934 | B1 * | 8/2005 | Osborne et al. | 717/126 |
| 6,961,924 | B2 * | 11/2005 | Bates et al. | 717/125 |
| 6,964,036 | B2 * | 11/2005 | Bates et al. | 717/125 |
| 6,988,264 | B2 * | 1/2006 | Sarma et al. | 717/128 |
| 7,010,782 | B2 * | 3/2006 | Narayan et al. | 717/124 |
| 7,032,213 | B1 * | 4/2006 | Lupu et al. | 717/129 |
| 7,069,512 | B2 * | 6/2006 | Harvey et al. | 715/736 |
| 7,100,150 | B2 * | 8/2006 | Polk | 717/124 |
| 7,171,652 | B2 * | 1/2007 | Motoyama et al. | 717/123 |
| 7,512,903 | B2 * | 3/2009 | Hudson, Jr. | 715/853 |
| 7,546,586 | B2 * | 6/2009 | Amit et al. | 717/124 |

OTHER PUBLICATIONS

Meng et al, "Performance analysis of several algorithms for processing joins between textual attributes", IEEE, pp. 636-644, 1996.*

Dadi et al, "Creating web service interfaces and scientific workflows using comman line tools: A grass example:", IEEE, pp. 1-6, 2009.*

(Continued)

*Primary Examiner*—Anil Khatri
(74) *Attorney, Agent, or Firm*—Dillon & Yudell LLP

(57) ABSTRACT

A system, method and computer program product for providing command-line warnings are disclosed. The method includes receiving a command as input at a command prompt and, in response to determining that said command is not entered in a structurally correct manner, providing to a user an opportunity to correct said command at said command prompt. In response to determining that said command is entered in an erroneous manner, warning and corrected usage data is shown, and in response to determining that said command is not likely to be safe, said command and said warning and corrected usage data are shown in a blinking yellow text. In response to determining that said command is critical, a final warning is displayed by employing a blinking red text and playing a sound.

12 Claims, 2 Drawing Sheets

OTHER PUBLICATIONS

Yu et al, "OpenXUP- an alternative approach to developing highly interactive web applications", ACM ICWE, pp. 289-296, 2006.*

Green et al, "Processing XML streams with deterministic automats and stream indexes", ACM Trans. on Database Systems, vol. 29, No. 4, pp. 752-788, 2004.*

KJ Baier, KJ Scully "Register For and Process Alarms to Alerts"; AT8930498; TDB v37 n9 Sep. 1994; pp. 339-344; Austin, Texas.

MI Murphy "Generic Command Line Parser"; TDB v37 n5 May 1994; pp. 55-58; Boca Raton, Florida.

CL Haymes, LV Marks "Command Line Interpreter That Adjusts To A User"; TDB v36 n9a Sep. 1993; pp. 173-176; Raleigh, North Carolina.

DE Hays "Method For Auxiliary Command Line Resolution"; TDB n9 Feb. 1992; Austin, Texas.

RJ Torres "Interactive Command Line Feedback"; Research Disclosure n292 Aug. 1988; Dallas, Texas.

DK Houghton, JN Mitchell "Indicating Errors to Deaf Operators"; TDB Jun. 1981; pp. 387-388; Austin, Texas.

* cited by examiner

COMMAND-LINE WARNINGS

BACKGROUND OF THE INVENTION

1. Technical Field

The present invention relates in general to data processing systems and in particular to use of a command line. Still more particularly, the present invention relates to a system, method and computer program product for providing command-line warnings on a data processing system.

2. Description of the Related Art

In computing, a command line interface or CLI is a method of interacting with a computer via a text terminal. Commands are entered as lines of text (that is, sequences of typed characters) from a keyboard, and output is also received as text. CLIs originated when teletype machines were connected to computers in the 1950s. In terms of immediate interaction and feedback, they represented an advance over the use of punch cards.

With the use of cathode ray tubes (CRTs) as interface devices, CLIs began evolving toward graphical user interfaces (GUIs) like Microsoft Windows®, Mac OS®, and the X Window System and were largely supplanted by GUIs when Microsoft Corporation, in response to the success of Apple's release of the Macintosh® OS in 1984, introduced Windows® the following year. Nevertheless, a significant minority of sophisticated computer users prefer to use CLIs, some due to visual disability, but most because they feel that CLIs provide an environment with enhanced productivity. They are most often used by programmers and system administrators, especially in Unix®-based operating systems; in engineering and scientific environments; and by a smaller subset of technically advanced home users.

In its simplest form, a CLI displays a prompt, the user types a command on the keyboard and terminates the command (usually with the Enter key), and the computer executes the command, providing textual output.

A program that implements such interface is often called a command line interpreter or shell. Examples include the various Unix® shells (sh, ksh, csh, tcsh, bash, etc.), the historical CP/M®, and DOS's command.com ("Command Prompt"), the latter two based heavily on Digital Equipment Corporation's RSX™ and RSTS™ CLIs. Microsoft's next operating system, Windows® Vista®, will include support for a new command line interface named MSH™ (Microsoft Shell, codename Monad), which hopes to combine features of traditional Unix® shells with their object oriented .NET® framework. Current Windows® CLI programs like DOS and Windows Script Host™ are commonly considered inadequate or insecure. MinGW is a third-party software for Windows that offers a true Unix® CLI.

Some applications provide both a CLI and a GUI. One example is the CAD program AutoCAD®. The engineering/scientific numerical computation package Matlab® provides no GUI for some calculations, but the CLI can handle any calculation. The three-dimensional-modeling program Rhinoceros 3D® (used to design the cases of most cell phones, as well as thousands of other industrial products) provides a CLI (whose language, by the way, is distinct from Rhino's scripting language). In some computing environments, such as the Oberon® or Smalltalk® user interface, most of the text which appears on the screen may be used for giving commands.

Certain commands, when invoked at a command line, can be destructive if improperly invoked. While many proposed solutions to command line entry problems have been proposed, none has proven adequate. These solutions have included flashing a series of 'are you sure' messages to a user and asking them to acknowledge the message before proceeding, the problem being that the messages are seldom any more captivating than any other message received from the command line. The user frequently presses 'yes' without reading the message in order to proceed. In addition, this prompting of messages works poorly when called from a script.

No solution to the problems of the prior art exists.

SUMMARY OF THE INVENTION

A system, method and computer program product for providing command-line warnings are disclosed. The method includes receiving a command as input at a command prompt and, in response to determining that said command is not entered in a structurally correct manner, providing to a user an opportunity to correct said command at said command prompt. In response to determining that said command is entered in an erroneous manner, warning and corrected usage data is shown, and in response to determining that said command is not likely to be safe, said command and said warning and corrected usage data are shown in a blinking yellow text. In response to determining that said command is critical, a final warning is displayed by employing a blinking red text and playing a sound.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for providing command-line warnings. Prior to executing a command received from the command line, an operating system checks a database of dangerous commands, which correlates those commands to predefined text warnings. A predefined text warning can consist of many different responses to the command, such as a change in text color, blinking text, or a warning string. The dangerous commands are text strings that the user may type on the terminal, and which are known to cause potentially destructive behavior. Example strings known to one skilled in the art include 'rm –rf' or 'dd of=/dev/* if=*'. If a partial match for a string in the database is detected at the command line, the warning can be triggered.

Figure 1A:
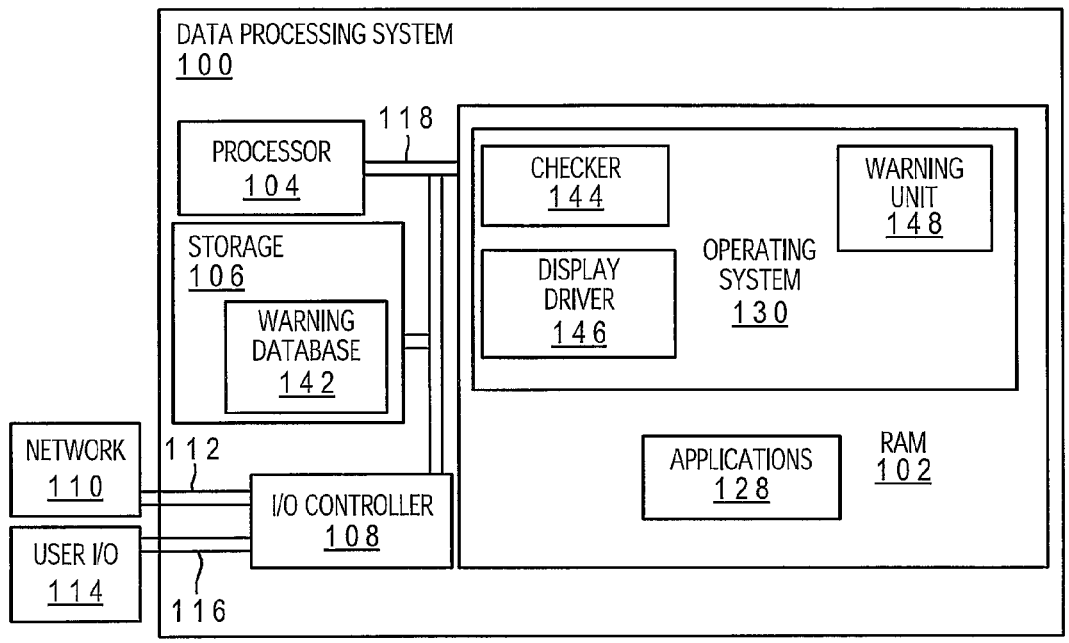
FIG. 1A depicts a block diagram of a general-purpose data processing system with which the present invention of a system, method and computer program product for performing command-line warnings may be performed.
Figure 1B:
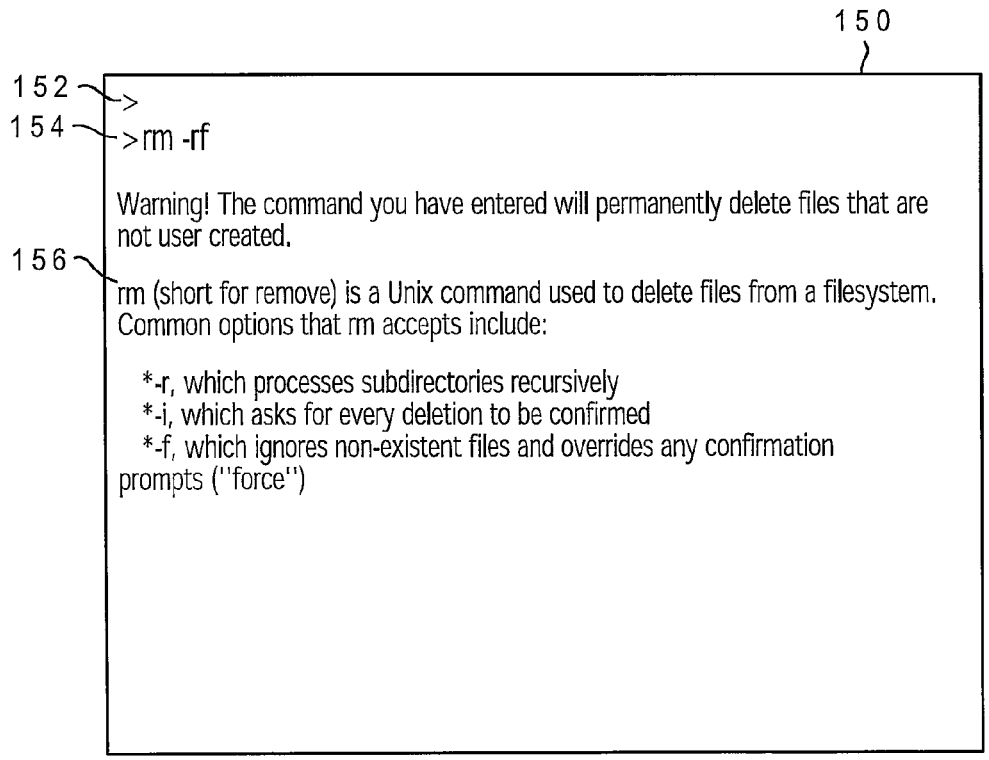
FIG. 1B depicts a screen display diagram in accordance with the present invention of a system, method and computer program product for performing command-line warnings.

With reference now to the figures, and in particular with reference to FIG. 1A, a block diagram of a general-purpose data processing system, in accordance with a preferred embodiment of the present invention, is depicted. Data processing system 100 contains a processing storage unit (e.g., RAM 102) and a processor 104. Data processing system 100 also includes non-volatile storage 106 such as a hard disk drive or other direct-access storage device. A warning database 142, which correlates text strings for known dangerous commands to their associated warning behavior, is stored in non-volatile storage 106. An Input/Output (I/O) controller 108 provides connectivity to a network 110 through a wired or wireless link, such as a network cable 112. I/O controller 108 also connects to user I/O devices 114 such as a keyboard, a display device, a mouse, a sound unit and a printer through wired or wireless link 116, such as cables or a radio-frequency connection. System interconnect 118 connects processor 104, RAM 102, storage 106, and I/O controller 108.

Within RAM 102, data processing system 100 stores several items of data and instructions while operating in accordance with a preferred embodiment of the present invention. Applications 128 interface with processor 104, RAM 102, I/O control 108, and storage 106 through operating system 130. One skilled in the data processing arts will quickly realize that additional components of data processing system 100 may be added to or substituted for those shown without departing from the scope of the present invention. A checker 144 in operating system 130, searches warning database 142 for text strings received at the command line by warning unit 148, to determine whether to provide a warning behavior through over user I/O 114 through display driver 146.

Turning now to FIG. 1A, a screen display diagram in accordance with the present invention of a system, method and computer program product for performing command-line warnings is illustrated. Screen display area 150 contains a first command prompt 152 and a second command prompt 154 with 'rm –rf' command entered. The command rm (short for remove) is a Unix command used to delete files from a filesystem. Common options that rm accepts include: –r, which processes subdirectories recursively, –i, which asks for every deletion to be confirmed, –f, which ignores non-existent files and overrides any confirmation prompts ("force"). The command rm is often aliased to "rm –i" so as to avoid accidental deletion of files. If a user still wishes to delete a large number of files without confirmation, they can manually cancel out the –i argument by adding the –f option. The command "rm –rf" (variously, "rm –rf /", "rm –rf *", and others) is frequently used in jokes and anecdotes about Unix disasters. The "rm –rf /" variant of the command, if run by an administrator, would cause the contents of every mounted disk on the computer to be deleted. Use of 'rm –rf' is an example of a destructive command that may be entered by a user.

In response to receiving 'rm –rf' from second command prompt 154, screen display area 150 will show warning and corrected usage data 156, with an opportunity to correct the command at first command prompt 152.

Figure 2:
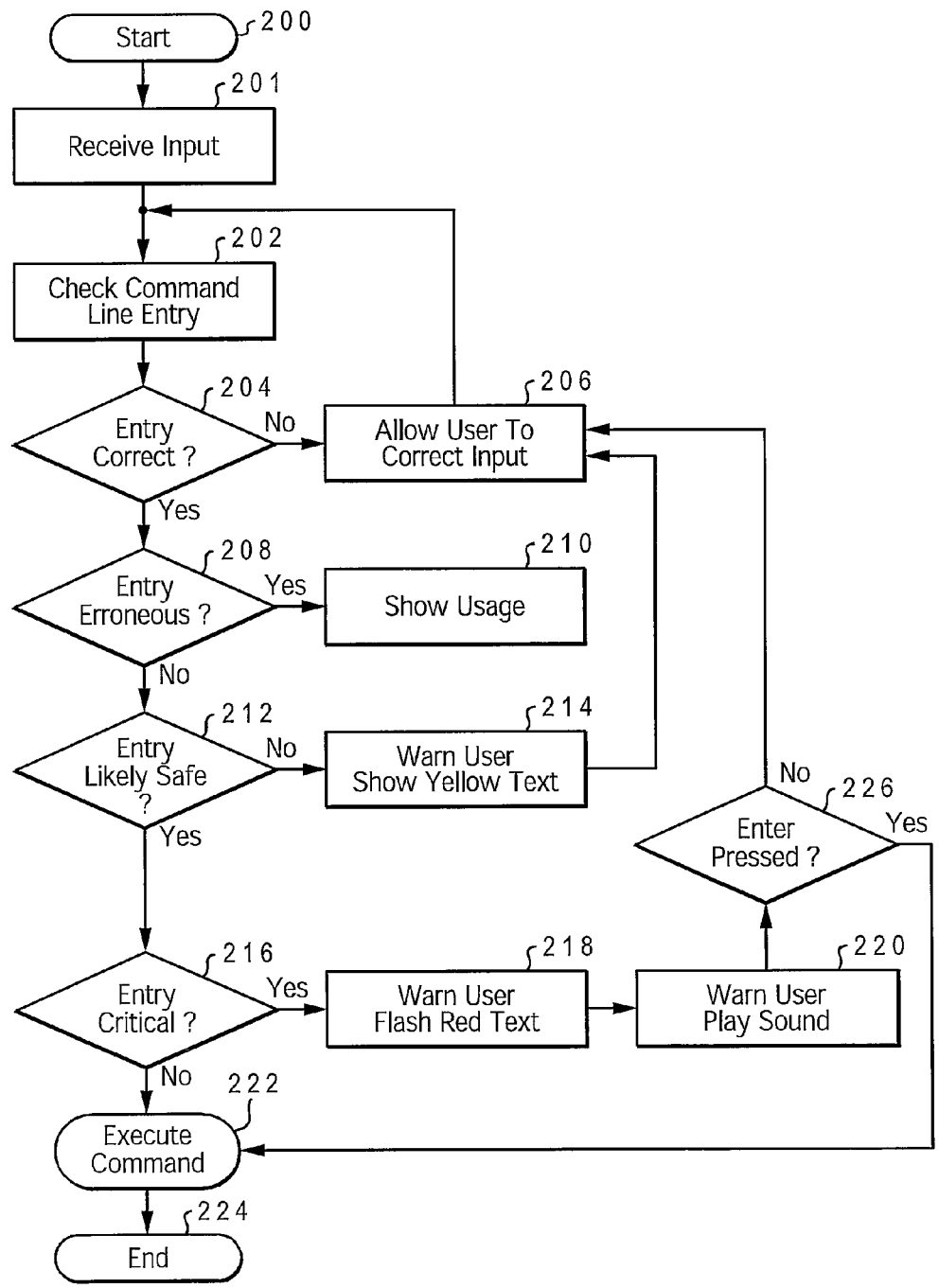
FIG. 2 is a high-level logical flowchart of a process for providing command-line warnings in accordance with a preferred embodiment of the present invention.

Turning now to FIG. 2, a high-level logical flowchart of a process for providing command-line warnings is depicted. The process starts at step 200 and then proceeds to step 201, which depicts operating system 130 receiving a command as input at a command prompt 154. The process then enters step 202, which illustrates checker 144 checking the command-line entry received in step 201 against warning database 142. The process next moves to step 204. Step 204 illustrates warning unit 148 determining whether the command received in step 201 is entered in a structurally correct manner. If warning unit 148 determines that the command received in step 201 is not entered in a structurally correct manner, then the process proceeds to step 206, which depicts operating system 130 giving the user an opportunity to correct input at first command prompt 152. The process then returns to step 202, which is described above.

Returning to step 204, if warning unit 148 determines that the command received in step 201 is entered in a structurally correct manner, then the process proceeds to step 208. Step 208 illustrates warning unit 148 determining whether the command shown received in step 201 is entered in a manner reflecting erroneous usage, such as an improper option. If warning unit 148 determines that the command received in step 201 is entered in a manner reflecting erroneous usage, then the process proceeds to step 210, which depicts warning unit 148 showing warning and corrected usage data 156 and third command prompt 158. The process then returns to step 206, which is described above.

Returning to step 208, if warning unit 148 determines that the command received in step 201 is not entered in a manner reflecting erroneous usage, then the process proceeds to step 212. Step 212 illustrates warning unit 148 determining whether the command received in step 201 is likely to be safe. If warning unit 148 determines that the command received in step 201 is not likely to be safe, then the process proceeds to step 214, which depicts warning unit 148 showing a cursor, the command entered and warning and corrected usage data 156 in blinking yellow.

Returning to step 212, if warning unit 148 determines that the command received in step 201 is likely to be safe, then the process proceeds to step 216. Step 216 illustrates warning unit 148 determining whether the command received in step 201 is critical, such as a command with potential adverse impact to operating system 130. If warning unit 148 determines that the command received in step 201 is critical, the process next moves to step 218, which illustrates warning unit 148 displaying a cursor, the command entered and warning and corrected usage data 156 in blinking red. The process then proceeds to step 220, which depicts operating system 130 playing a sound over a sound unit of user I/O 114. The process next moves to step 226. Step 226 depicts operating system 130 determining whether 'enter' or another button to finalize a command has been pressed. If operating system 130 determines that 'enter' or another button to finalize a command has not been pressed, then the process then returns to step 206, which is described above. Converse, if operating system 130 determines that 'enter' or another button to finalize a command has been pressed, then the process then the process to step 222, which depicts operating system 130 executing the command.

Returning to step 216, if warning unit 148 determines that the command received in step 201 is not critical, the process next moves to step 222, which depicts operating system 130 executing the command. The process then ends at step 224.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for providing command-line warnings, said method comprising:
   in response to a computer receiving a command as input, a processor of the computer:
      displaying the command at a first command prompt with a first set of textual attributes; and
      processing the command;
   in response to the computer determining by the processing that said command was entered in a structurally incorrect manner, the computer permitting correction of said command;
   in response to the computer determining by the processing that said command is destructive of data, the computer displaying a first warning and displaying the destructive command at a second command prompt, wherein the first warning and the destructive command are displayed with text having a second set of textual attributes distinct from the first second of textual attributes; and
   in response to the computer determining by the processing that said command is critical, the computer:
      displaying a second warning;
      displaying the critical command at the second command prompt, wherein the second warning and critical command are displayed with text having a third set of textual attributes distinct from the first and second sets of textual attributes; and
      presenting an audible third warning; said method further comprising, in response to the computer determining by the processing that command is not critical, executing said command.

2. The method of claim 1, said processing comprising checking said command against a database.

3. The method of claim 1, wherein the first and second sets of textual attributes respectively comprise different first and second textual colors.

4. The method of claim 1, and further comprising:
   executing the critical command in response to confirmation of the critical command at the second command prompt.

5. A data processing system for providing command-line warnings, said data processing system comprising:
   a processor; and
   data storage coupled to the processor and including program code that, when executed by the processor, causes the processor to perform:
      in response to the data processing system receiving a command as input, the processor displaying the command at a first command prompt with a first set of textual attributes and processing the command;
      in response to the processor determining by the processing that said command was entered in a structurally incorrect manner, the processor permitting correction of said command;
      in response to determining by the processing that said command is destructive of data, the processor displaying a first warning and displaying said destructive command with text having a second set of textual attributes distinct from the first second of textual attributes; and
      in response to the processor determining by the processing that said command is critical, the processor displaying a second warning, displaying the critical command at the second command prompt and presenting an audible third warning, wherein the second warning and the critical command are displayed with text having a third set of textual attributes distinct from the first and second sets of textual attributes wherein said program code further causes the processor to perform: in response to response to the computer determining by the processing that command is not critical, executing said command.

6. The data processing system of claim 5, said processing comprising checking said command against a database.

7. The data processing system of claim 5, wherein the first and second sets of textual attributes respectively comprise different first and second textual colors.

8. The data processing system of claim 5, wherein the program code causes the processor to execute the critical command in response to confirmation of the critical command at the second command prompt.

9. A machine-readable storage medium having stored therein a plurality of instructions processable by a computer, wherein said plurality of instructions, when processed by said computer, causes said computer to perform:
   in response to the computer receiving a command as input, the computer displaying the command at a first command prompt with a first set of textual attributes and processing the command;
   in response to the computer determining by the processing that said command was entered in a structurally incorrect manner, the computer permitting correction of said command;
   in response to the computer determining by the processing that said command is destructive of data, the computer displaying a first warning and displaying the destructive command at a second command prompt, wherein said first warning and the destructive command are displayed with text having a second set of textual attributes distinct from the first second of textual attributes; and
   in response to the computer determining by the processing that said command is critical, the computer displaying a second warning, displaying said critical command at the second command prompt, and presenting an audible third warning, wherein said critical command and second warning are displayed with text having a third set of textual attributes distinct from the first and second sets of textual attributes wherein said program code further causes the processor to perform: in response to response to the computer determining by the processing that command is not critical, executing said command.

10. The machine readable storage medium of claim 9, said processing comprising checking said command against a database.

11. The machine-readable storage medium of claim 9, wherein the first and second sets of textual attributes respectively comprise different first and second textual colors.

12. The machine-readable storage medium of claim 9, wherein the plurality of instructions cause the computer to execute the critical command in response to confirmation of the critical command at the second command prompt.

* * * * *